US008622748B2

(12) United States Patent
Wang et al.

(10) Patent No.: US 8,622,748 B2
(45) Date of Patent: Jan. 7, 2014

(54) ANKLE ASSEMBLY FOR CRASH TEST DUMMY

(75) Inventors: Zhenwen J. Wang, Northville, MI (US); Bernard Been, The Hague (NL); Cheng Yao, Fairfax, VA (US)

(73) Assignee: Humanetics Innovative Solutions, Inc., Plymouth, MI (US)

( * ) Notice: Subject to any disclaimer, the term of this patent is extended or adjusted under 35 U.S.C. 154(b) by 207 days.

(21) Appl. No.: 13/338,760

(22) Filed: Dec. 28, 2011

(65) Prior Publication Data

US 2012/0167699 A1    Jul. 5, 2012

Related U.S. Application Data

(60) Provisional application No. 61/428,565, filed on Dec. 30, 2010.

(51) Int. Cl.
    *G09B 23/28*        (2006.01)
(52) U.S. Cl.
    USPC ......................................................... 434/274
(58) Field of Classification Search
    USPC ................... 434/272, 267, 274; 72/172, 866.4
    See application file for complete search history.

(56) References Cited

U.S. PATENT DOCUMENTS

| 4,349,339 A * | 9/1982 | Daniel .......................... 434/274 |
| 4,850,877 A * | 7/1989 | Mason et al. .................. 434/274 |
| 5,741,989 A * | 4/1998 | Viano et al. ................... 73/866.4 |
| 6,409,516 B1 * | 6/2002 | Thill ............................. 434/274 |
| 6,695,619 B2 * | 2/2004 | Brown-Wilkinson ......... 434/274 |
| 6,957,961 B1 * | 10/2005 | Owens et al. .................. 434/270 |
| 6,982,409 B2 | 1/2006 | Huang et al. |
| 7,086,273 B2 | 8/2006 | Lipmyer |
| 7,891,259 B2 * | 2/2011 | Kim et al. ................. 73/862.391 |
| RE42,418 E | 6/2011 | Lipmyer |
| 2008/0021570 A1 * | 1/2008 | Bedard et al. .................... 623/40 |

* cited by examiner

*Primary Examiner* — Kurt Fernstrom
(74) *Attorney, Agent, or Firm* — Howard & Howard Attorneys PLLC (57) ABSTRACT

An ankle assembly for a crash test dummy includes an ankle clevis assembly for attachment to a leg assembly of the crash test dummy, an ankle base assembly for attachment to a foot assembly of the crash test dummy and cooperating with the ankle clevis assembly, a fastener to connect the clevis assembly and the ankle base assembly together to allow proper ankle positions for different ankles and also allow friction adjustment to simulate human bracing in impact conditions, and a plurality of elastomeric elements disposed between the clevis assembly and the ankle base assembly that allow proper inversion and eversion performance of the ankle assembly.

22 Claims, 8 Drawing Sheets

FIG 16

ANKLE ASSEMBLY FOR CRASH TEST DUMMY

CROSS-REFERENCE TO RELATED APPLICATION(S)

The present application claims the priority date of U.S. Provisional Patent Application Ser. No. 61/428,565, filed Dec. 30, 2010.

BACKGROUND OF THE INVENTION

1. Field of the Invention

The present invention relates generally to crash test dummies and, more particularly, to an ankle assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic mannequins, better known as "crash test dummies." During collision testing, an operator places a crash test dummy inside a vehicle, and the vehicle undergoes a simulated collision. The collision exposes the crash test dummy to high inertial loading, and sensors inside the crash test dummy, such as accelerometers, pressure gauges, and the like, generate electrical signals of data corresponding to the loading. Cables transmit these electrical signals of data to a data acquisition system (DAS) for subsequent processing. This data reveals information about the effects of the collision on the crash test dummy and can be correlated to the effects a similar collision would have on a human occupant.

SUMMARY OF THE INVENTION

Accordingly, the present invention is an ankle assembly for a crash test dummy. The ankle assembly includes an ankle base assembly for attachment to a foot of the crash test dummy. The ankle assembly also includes a clevis assembly for attachment to a leg of the crash test dummy and cooperating with the ankle base assembly. The clevis assembly includes a clamping nut to allow proper ankle positions for different ankle and also allow friction adjustment to simulate human bracing in impact conditions. The ankle assembly further includes a plurality of elastomeric elements that allow proper inversion and eversion performance.

In addition, the present invention is a crash test dummy including a body having a leg and a foot. The crash test dummy includes an ankle assembly interconnecting the leg and foot. The ankle assembly includes an ankle base assembly attached to the foot and a clevis assembly attached to the leg and cooperating with the ankle base assembly. The clevis assembly includes a fastener to connect the clevis assembly and the ankle base assembly together to allow proper ankle positions for different ankles and also allow friction adjustment to simulate human bracing in impact conditions. The ankle assembly further includes a plurality of elastomeric elements disposed between the clevis assembly and ankle base assembly that allow proper inversion and eversion performance of the ankle assembly.

One advantage of the present invention is that a new ankle assembly is provided for a crash test dummy. Another advantage of the present invention is that the ankle assembly includes a friction shoulder bolt that acts as a clamping nut to allow proper ankle positions for different ankles and also allow friction adjustment to simulate human bracing in impact conditions. Yet another advantage of the present invention is that the ankle assembly includes a plurality of elastomeric elements that allow proper inversion and eversion performance of the ankle assembly. Still another advantage of the present invention is that the ankle assembly provides an ankle joint that offers human like range of motion. A further advantage of the present invention is that the ankle assembly has at least one elastomeric element to provide visco-elastic loading response like a human ankle under tension. Yet a further advantage of the present invention is that the ankle assembly allows enough range of motion to allow the dummy toe to touch the brake pedal during the dummy positioning all the time for different vehicle designs. Still a further advantage of the present invention is that the ankle assembly allows the foot to pivot along the ankle joint for adjustment. Yet still a further advantage of the present invention is that the ankle assembly serves as a new tool for automotive crash impact development.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figures 1, 2:
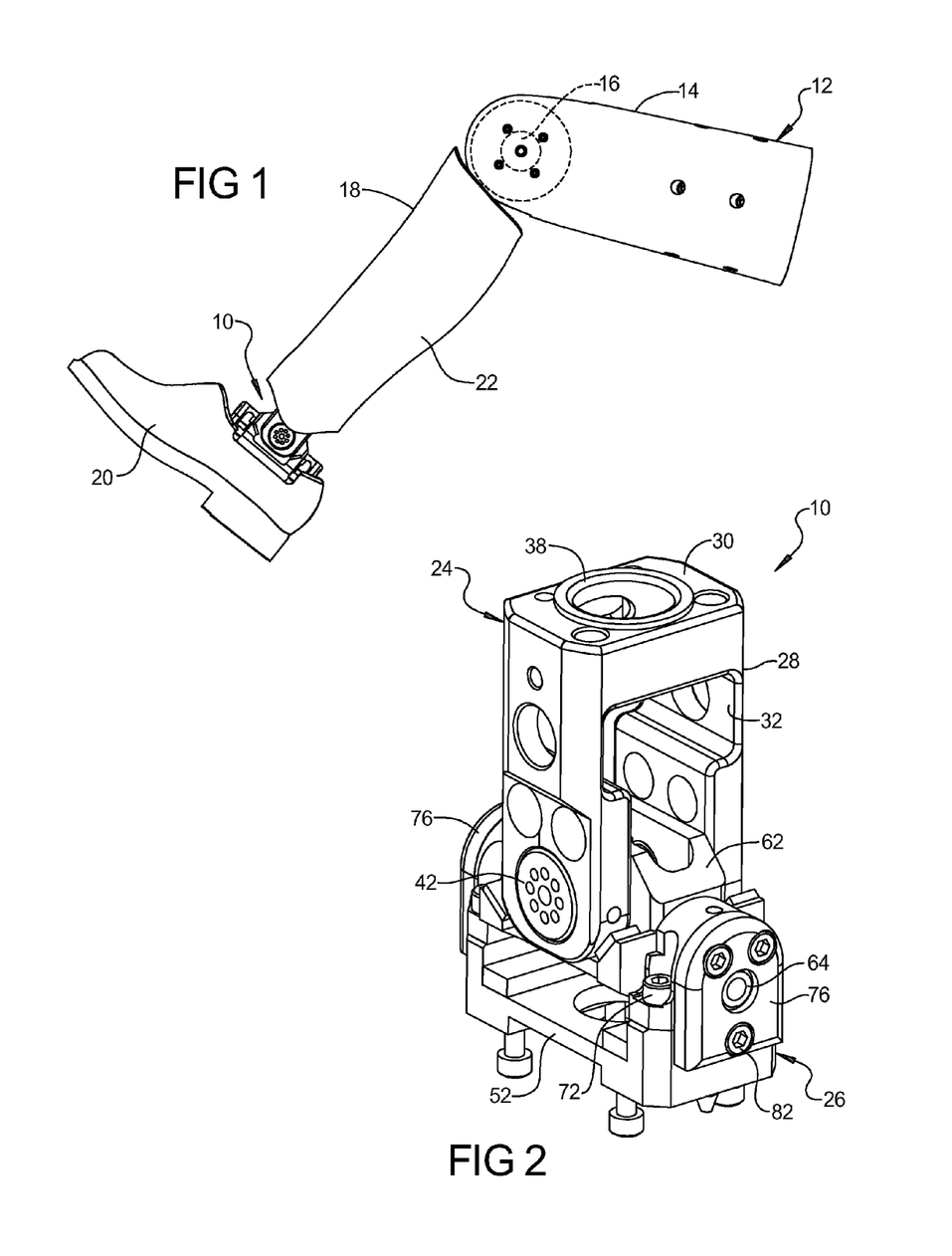
FIG. 1 is an elevational view of an ankle assembly, according to the present invention, illustrated in operational relationship with a crash test dummy.
FIG. 2 is an enlarged perspective view of the ankle assembly of FIG. 1.
Figure 3:
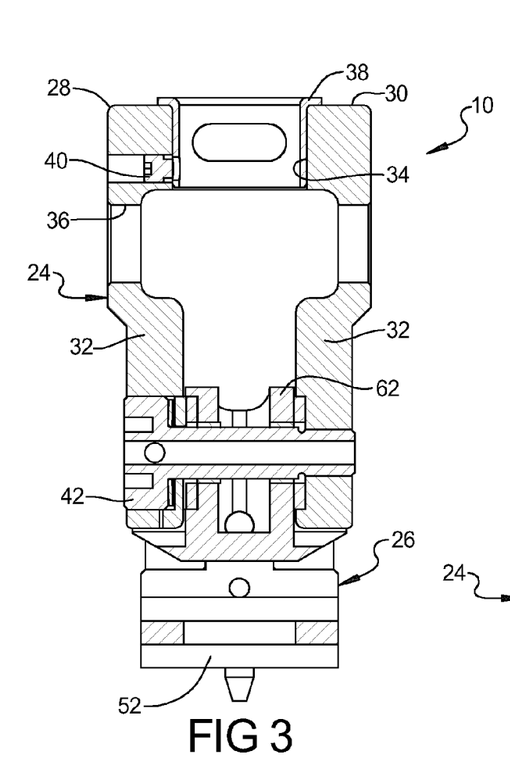
FIG. 3 is a sectional view of the ankle assembly of FIG. 2.
Figure 4:
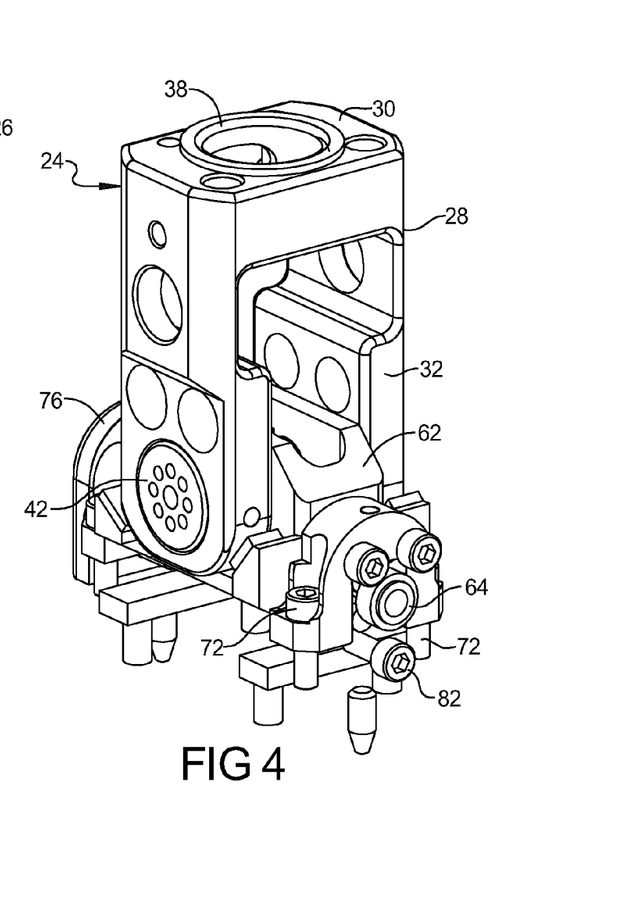
FIG. 4 is a perspective view of the ankle assembly of FIG. 2 with portions removed.
Figure 5:
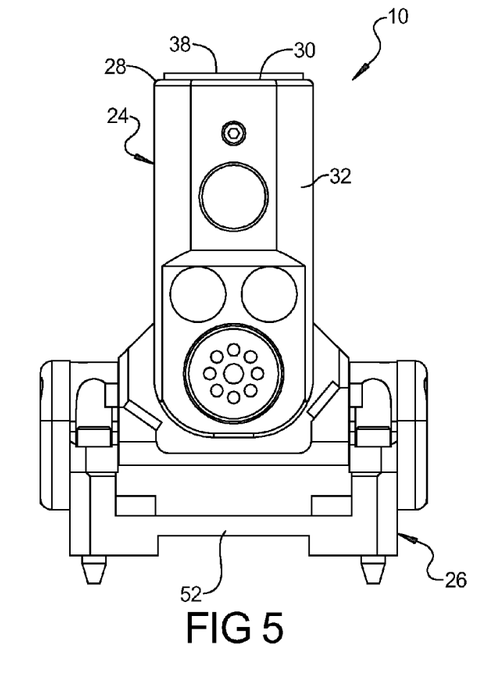
FIG. 5 is a front view of the ankle assembly of FIG. 2.
Figure 6:
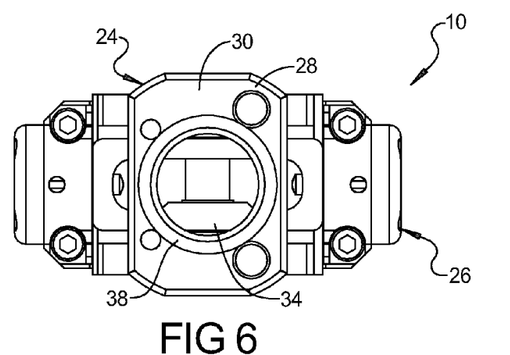
FIG. 6 is a top view of the ankle assembly of FIG. 2.
Figure 7:
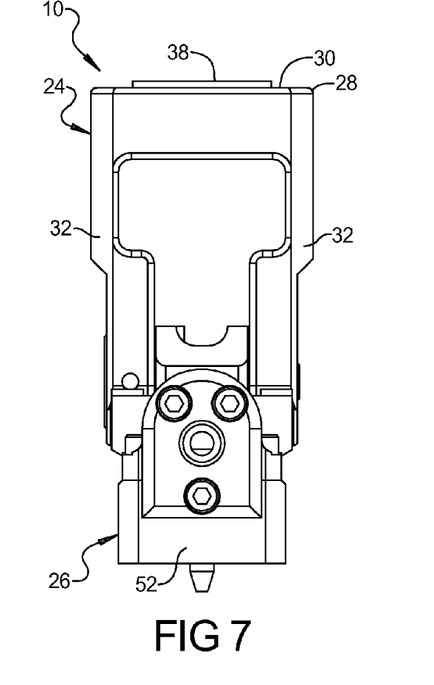
FIG. 7 is a side view of the ankle assembly of FIG. 2.
Figure 8:
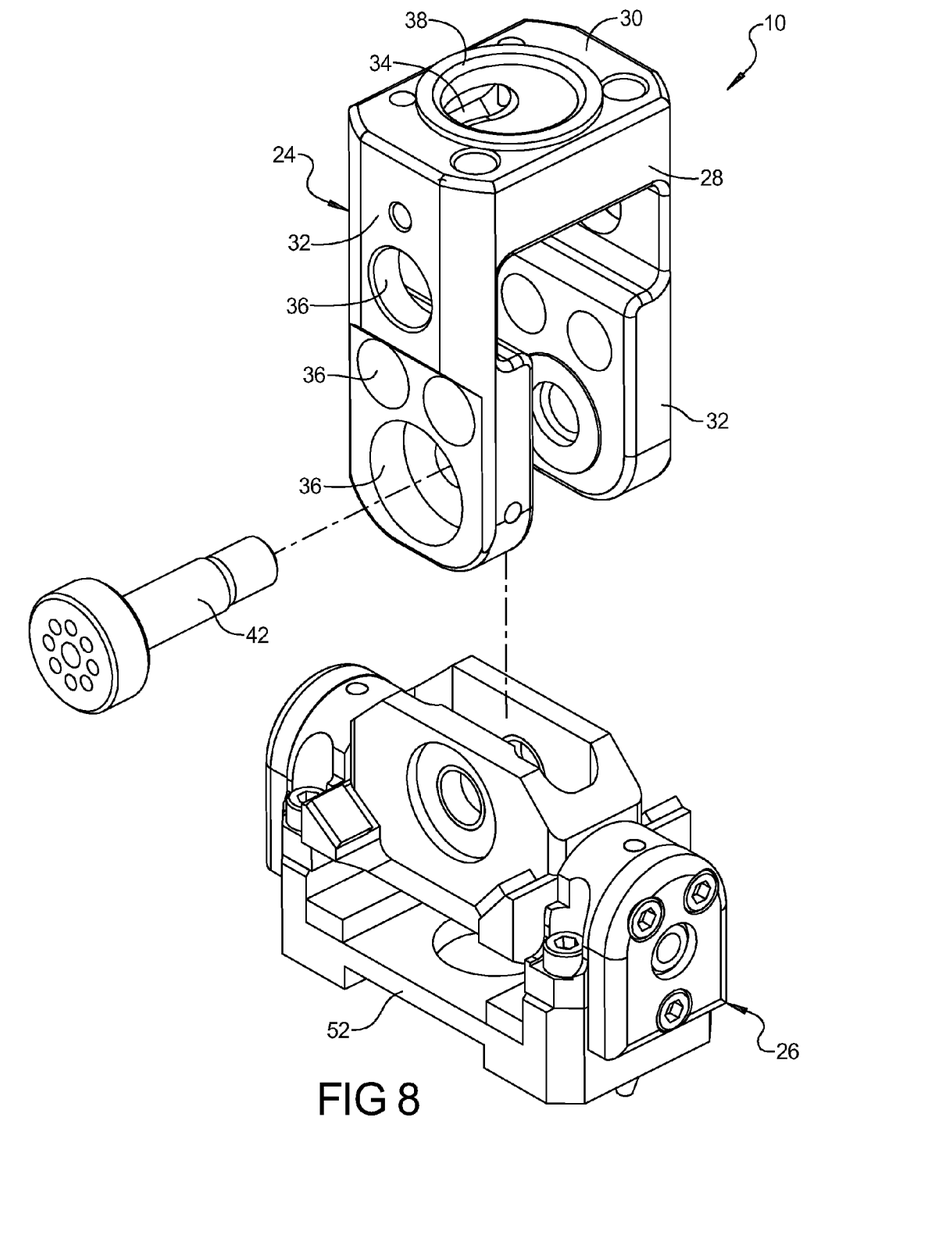
FIG. 8 is an exploded view of the ankle assembly of FIG. 2.
Figure 9:
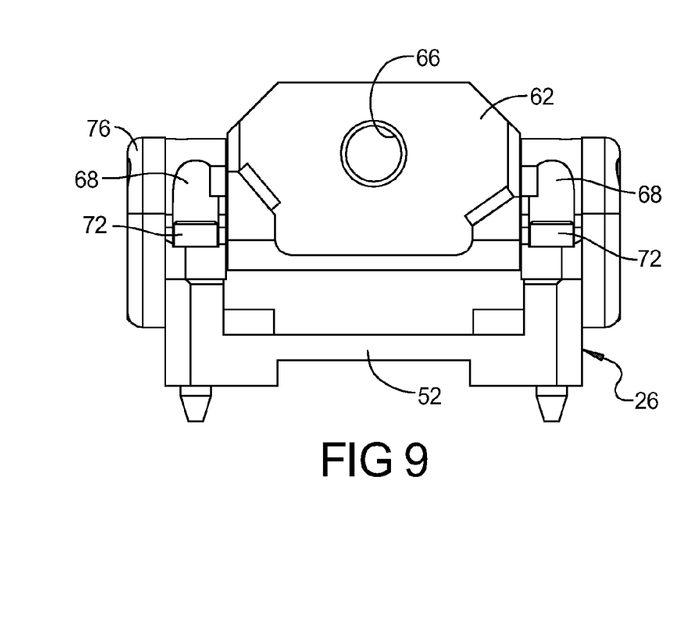
FIG. 9 is a front view of an ankle base assembly of the ankle assembly of FIG. 2.
Figure 10:
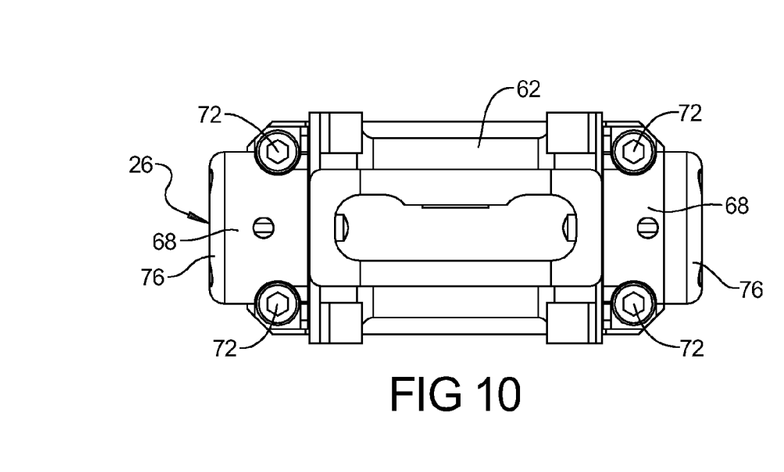
FIG. 10 is a top view of the ankle base assembly of FIG. 2.
Figure 11:
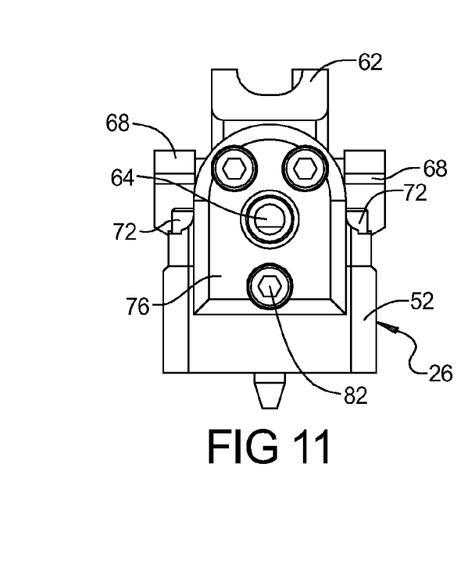
FIG. 11 is a side view of the ankle base assembly of FIG. 2.
Figure 12:
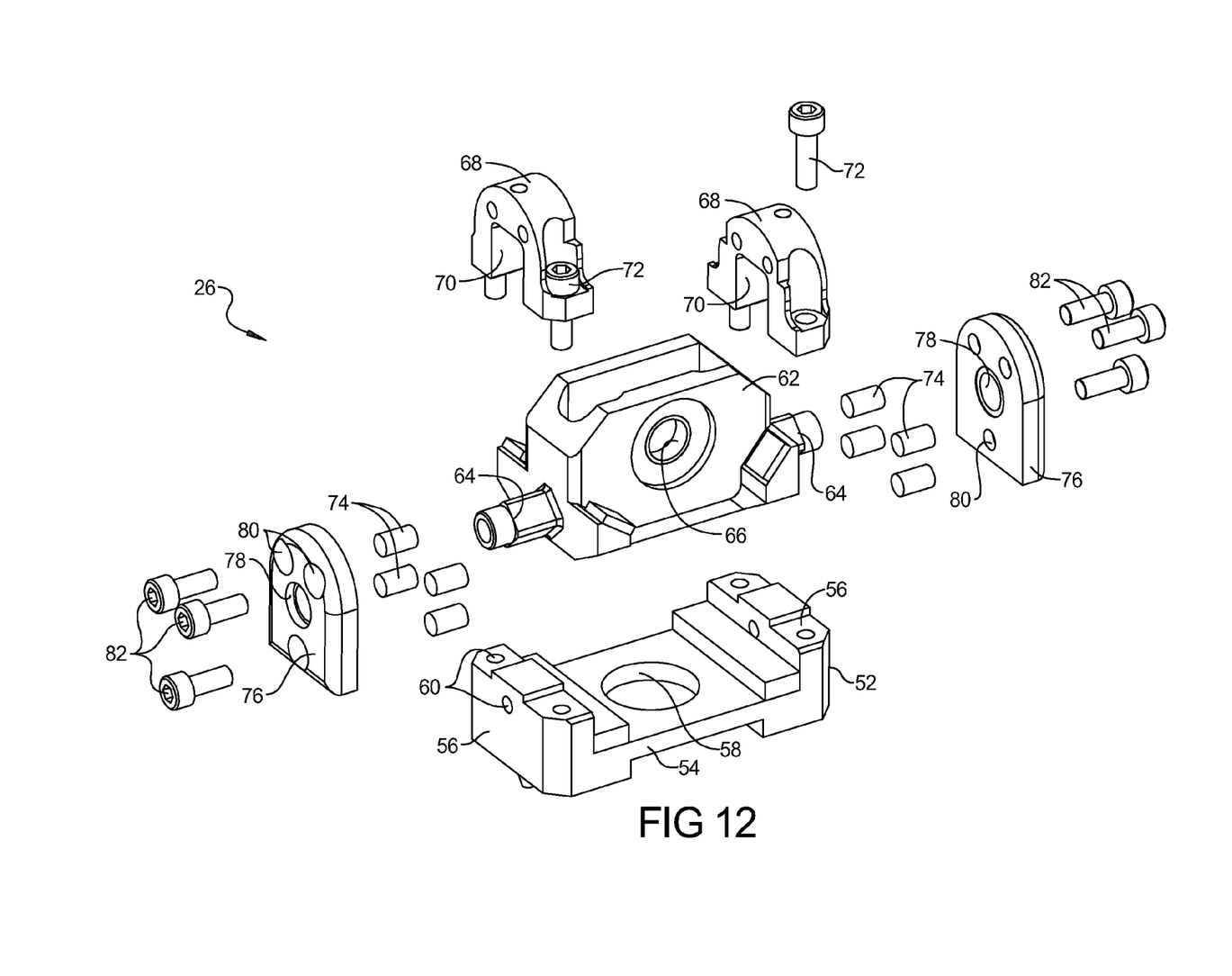
FIG. 12 is an exploded view of the ankle base assembly of FIG. 2.
Figure 13:
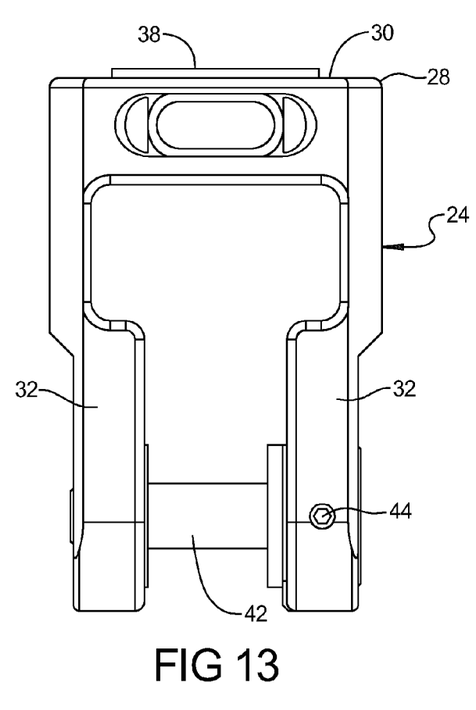
FIG. 13 is a front view of a clevis assembly of the ankle assembly of FIG. 2.
Figure 14:
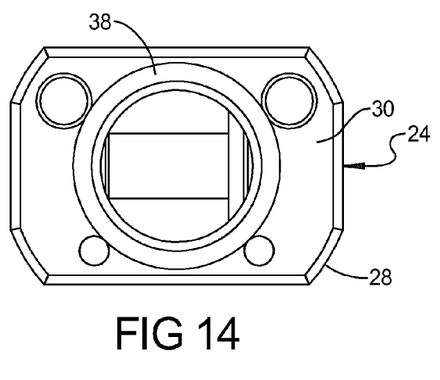
FIG. 14 is a top view of the clevis assembly of FIG. 2.
Figure 15:
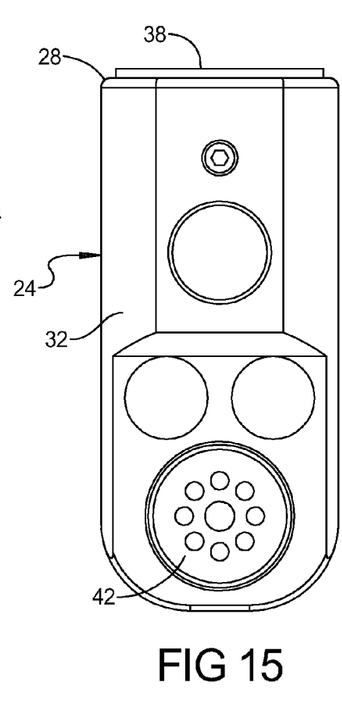
FIG. 15 is a side view of the clevis assembly of FIG. 2.
Figure 16:
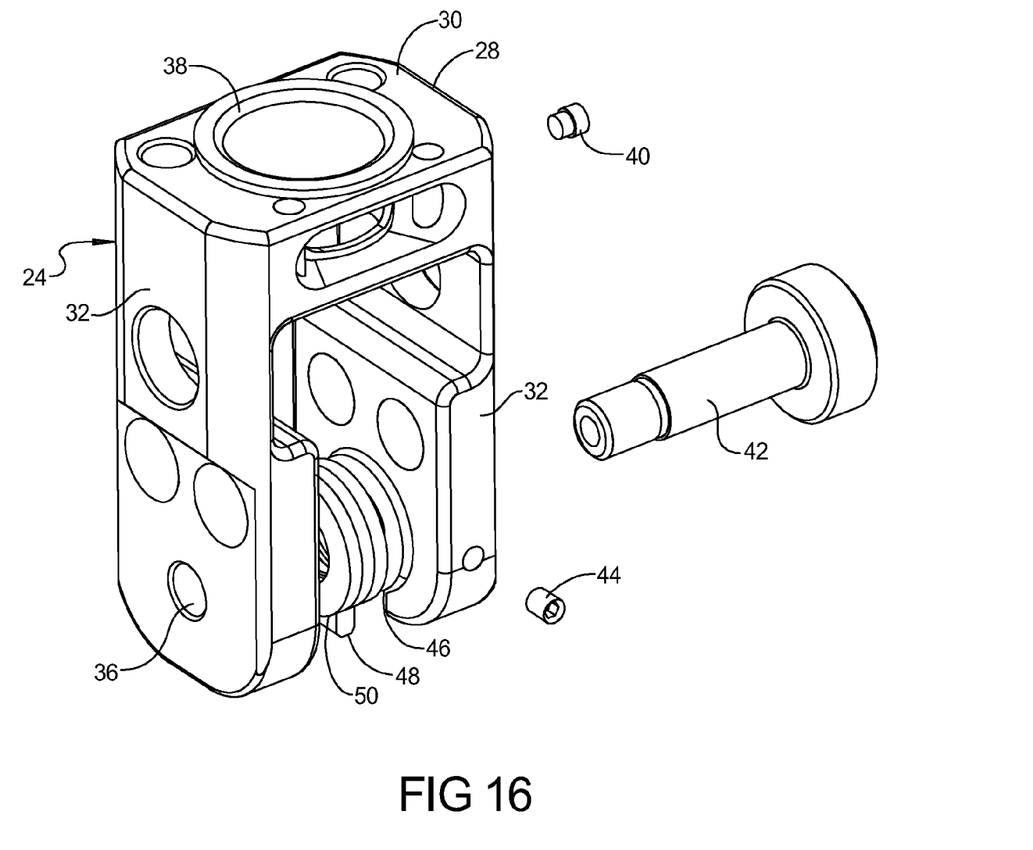
FIG. 16 is an exploded view of the clevis assembly of FIG. 2.

Referring to the drawings and in particular FIG. 1, one embodiment of an ankle assembly 10, according to the present invention, is shown in operational relationship with a crash test dummy, generally indicated at 12 and partially shown. The crash test dummy 12 is of a three-year-old child side impact dummy and is illustrated in a seated position. This crash test dummy 12 is used primarily to test the performance of automotive interiors and restraint systems for small children front and rear seat occupants. The size and weight of the crash test dummy 12 are based on anthropometric studies by the Human Biomechanics and Simulation Standards Committee Task Force of the Society of Automotive Engineers. It should be appreciated that ranges of motions, centers of gravity, and segment masses simulate those of human subjects defined by the anthropometric data.

As illustrated in the FIG. 1, the crash test dummy 12 includes a femur assembly 14 for a left leg having one end connected to a pelvis assembly (not shown) and an opposite end connected to a knee assembly 16. The crash test dummy 12 also includes a tibia assembly 18 having one end connected to the knee assembly 16 and an opposite end connected to the ankle assembly 10. The crash test dummy 12 includes a foot assembly 20 connected to the ankle assembly 10. It should be appreciated that, although only the left leg is described, the right leg is similar in construction.

The various components of the crash test dummy 12 are covered in a vinyl skin. The crash test dummy 12 includes a lower leg flesh/skin 22 covering a portion of the leg between the knee assembly 16 and the foot assembly 20. It should be appreciated that the crash test dummy 12 is placed into and out of test fixtures (not shown) and vehicles (not shown).

Referring to FIGS. 2 through 16, the ankle assembly 10 includes an ankle clevis assembly, generally indicated at 24, attached to the tibia assembly 18 and an ankle base assembly, generally indicated at 26, attached to the foot assembly 20 and cooperating with the ankle clevis assembly 24. The ankle clevis assembly 24 includes a clevis member 28 having a generally inverted "U" shape. The clevis member 28 has a top portion 30 extending laterally and side portions 32 extending downwardly therefrom. The top portion 30 has an aperture 34 extending therethrough. Each of the side portions 32 have at least one aperture 36 extending therethrough. The clevis member 28 is made of a metal material.

The ankle clevis assembly 24 also includes an insert member 38 disposed in the aperture 34 of the top portion 30 of the clevis member 28. The insert member 34 is generally tubular in shape. The ankle clevis assembly 24 includes a screw 40 threadably engaging one of the apertures in the side portions to engage and secure the insert member 38 to the clevis member 28.

The ankle clevis assembly 24 includes an ankle friction shoulder bolt 42 extending through opposed apertures 36 in the side portions 32 of the clevis member 28. The ankle clevis assembly 24 includes a screw 44 threadably engaging one of the apertures in the side portions 32 to engage and secure the shoulder bolt 42 to the clevis member 28. The ankle clevis assembly 24 also includes a spring 46 such as a Belleville disc disposed about the shoulder bolt 42 between the side portions 32 of the clevis member 28. The ankle clevis assembly 24 also includes a stop ring 48 disposed adjacent the spring 46 about the shoulder bolt 42 between the side portions 32 of the clevis member 28. The ankle clevis assembly 24 includes at least one washer 50 disposed adjacent the stop ring 48 about the shoulder bolt 42 between the side portions 32 of the clevis member 28. The washer 50 is of a flat washer type.

The ankle base assembly 26 includes an ankle base member 52 having a general "U" shape. The ankle base member 52 has a bottom portion 54 extending laterally and side portions 56 extending upwardly therefrom. The bottom portion 54 has an aperture 68 extending therethrough. Each of the side portions 56 have at least one aperture 60 extending therein. The base member 52 is made of a metal material.

The ankle base assembly 26 also includes an ankle joint member 62 pivotally connected to the ankle base member 52. The ankle joint member 62 is generally rectangular in shape and has a pair of shafts 64 extending laterally with one shaft 64 at each end thereof. The ankle joint member 62 also has an aperture 66 extending longitudinally therethrough to receive the shoulder bolt 42. It should be appreciated that the ankle joint member 62 is sandwiched between the side portions 32 of the clevis member 28 with the shoulder bolt 42 extending therethrough to secure the clevis assembly 24 to the ankle base assembly 26.

The ankle base assembly 26 includes a retainer bracket 68 over each shaft 64 of the ankle joint member 62. The retainer bracket 68 is generally "U" shaped and has a cavity 70 therein to receive the shaft 64. The ankle base assembly further includes at least one, preferably a plurality of fasteners 72 such as screws to secure each retainer bracket 68 to the ankle base member 52.

The ankle base assembly 26 also includes at least one, preferably a plurality of resistive elements 74 disposed in the cavity 70 between the shaft 64 and the retainer bracket 68. The resistive elements 74 are generally cylindrical in shape. The resistive elements 74 are made of an elastomeric material.

The ankle base assembly 26 further includes a retainer bearing cover 76 secured to each retainer bracket 68. The retainer bearing cover 76 includes a first aperture 78 extending therethrough to receive on end of the shaft 64. The retainer bearing cover 76 has a plurality of second apertures 80 extending therethrough. The ankle base assembly 26 also includes a plurality of fasteners 82 such as screws to extend through the apertures 80 in the retainer bearing cover 76 and threadably engage apertures in the retainer bracket 68 to secure the bearing cover 76 to the retainer bracket 68. It should be appreciated that the resistive elements 74 allow proper inversion and eversion performance. It should also be appreciated that the ankle joint member 62 is clamped between the clevis member 28 to allow proper ankle positions for different ankles and also allow friction adjustment to simulate human bracing in vehicle impact conditions of the ankle assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An ankle assembly for a crash test dummy comprising:
   an ankle clevis assembly for attachment to a leg assembly of the crash test dummy;
   an ankle base assembly for attachment to a foot assembly of the crash test dummy and cooperating with said ankle clevis assembly;
   a fastener to connect said clevis assembly and said ankle base assembly together to allow proper ankle positions for different ankles and also allow friction adjustment to simulate human bracing in impact conditions; and
   a plurality of elastomeric elements disposed between said clevis assembly and said ankle base assembly that allow proper inversion and eversion performance of said ankle assembly.

2. An ankle assembly as set forth in claim 1 wherein said ankle clevis assembly includes a clevis member having a top portion extending laterally and side portions extending downwardly therefrom, each of said side portions having at least one aperture extending therethrough.

3. An ankle assembly as set forth in claim 2 wherein said ankle clevis assembly includes a screw threadably engaging one of said apertures in said side portions to engage and secure said fastener to said clevis member.

4. An ankle assembly as set forth in claim 2 wherein said ankle clevis assembly includes a spring disposed about said fastener between said side portions of said clevis member.

5. An ankle assembly as set forth in claim 1 wherein said ankle base assembly includes an ankle base member having a bottom portion extending laterally and side portions extending upwardly therefrom, each of said side portions having at least one aperture extending therein.

6. An ankle assembly as set forth in claim 5 wherein said ankle base assembly includes an ankle joint member pivotally connected to said ankle base member.

7. An ankle assembly as set forth in claim 6 wherein said ankle joint member has a pair of shafts extending laterally with one of said shafts at each end thereof.

8. An ankle assembly as set forth in claim 7 wherein said ankle base assembly includes a retainer bracket over each of said shafts of said ankle joint member and secured to said ankle base member.

9. An ankle assembly as set forth in claim 6 wherein said ankle joint member has an aperture extending longitudinally therethrough to receive said fastener.

10. An ankle assembly as set forth in claim 1 wherein said elastomeric elements are generally cylindrical in shape and disposed between said shafts and said retainer brackets.

11. An ankle assembly as set forth in claim 1 wherein said elastomeric elements are made of an elastomeric material.

12. A crash test dummy comprising:
a body including a leg assembly, a foot assembly, and an ankle assembly interconnecting said leg assembly and said foot assembly; and
said ankle assembly comprising an ankle clevis assembly attached to said leg assembly, an ankle base assembly attached to said foot assembly, a fastener to connect said clevis assembly and said ankle base assembly together to allow proper ankle positions for different ankles and also allow friction adjustment to simulate human bracing in impact conditions, and a plurality of elastomeric elements disposed between said clevis assembly and said ankle base assembly that allow proper inversion and eversion performance of said ankle assembly.

13. A crash test dummy as set forth in claim 12 wherein said ankle clevis assembly includes a clevis member having a top portion extending laterally and side portions extending downwardly therefrom, each of said side portions having at least one aperture extending therethrough.

14. A crash test dummy as set forth in claim 13 wherein said ankle clevis assembly includes a screw threadably engaging one of said apertures in said side portions to engage and secure said fastener to said clevis member.

15. A crash test dummy as set forth in claim 12 wherein said ankle clevis assembly includes a spring disposed about said fastener between said side portions of said clevis member.

16. A crash test dummy as set forth in claim 12 wherein said ankle base assembly includes an ankle base member having a bottom portion extending laterally and side portions extending upwardly therefrom, each of said side portions having at least one aperture extending therein.

17. A crash test dummy as set forth in claim 16 wherein said ankle base assembly includes an ankle joint member pivotally connected to said ankle base member.

18. A crash test dummy as set forth in claim 17 wherein said ankle joint member has a pair of shafts extending laterally with one of said shafts at each end thereof.

19. A crash test dummy as set forth in claim 18 wherein said ankle base assembly includes a retainer bracket over each of said shafts of said ankle joint member and secured to said ankle base member.

20. A crash test dummy as set forth in claim 17 wherein said ankle joint member has an aperture extending longitudinally therethrough to receive said fastener.

21. A crash test dummy as set forth in claim 12 wherein said elastomeric elements are generally cylindrical in shape and disposed between said shafts and said retainer brackets.

22. A crash test dummy as set forth in claim 12 wherein said elastomeric elements are made of an elastomeric material.

* * * * *